Patented Apr. 16, 1935

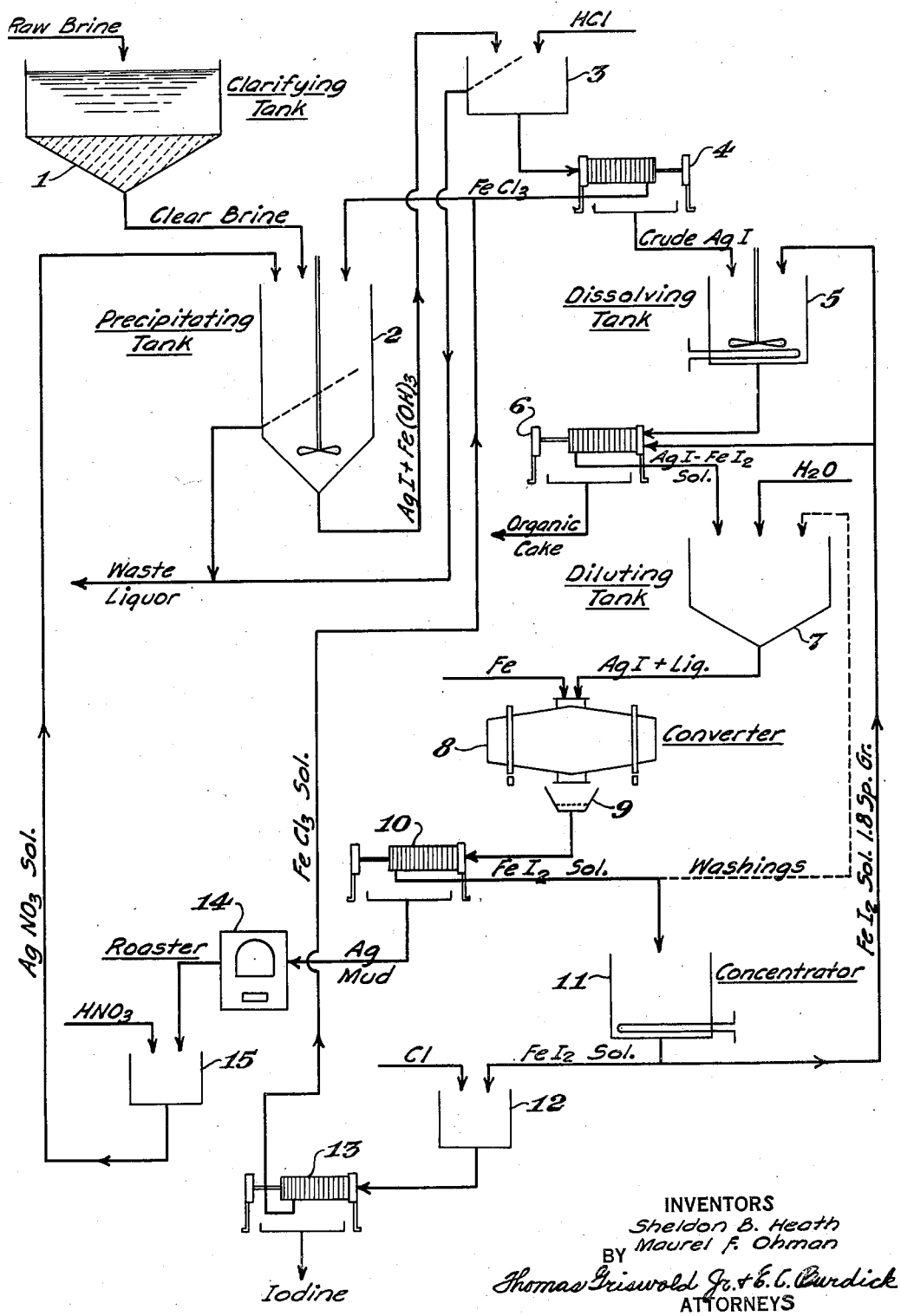

1,998,014

UNITED STATES PATENT OFFICE 1,998,014

PREPARATION OF IODINE FROM IMPURE SILVER IODIDE

Sheldon B. Heath and Maurel F. Ohman, Midland, Mich., assignors to The Dow Chemical Company, Midland, Mich., a corporation of Michigan Application August 17, 1933, Serial No. 685,520

13 Claims. (Cl. 23—217)

The present invention relates to the process of extracting iodine from natural brines and the like, wherein the iodine is precipitated as silver iodide and the latter is treated for the preparation of pure iodine or iodine compounds. It has particular regard to the treatment of such silver iodide precipitate for purifying the same from organic matter and other impurities normally accompanying the same, especially in the case of the precipitate obtained from oil-field brines, which is the usual type of natural brine processed for the commercial production of iodine.

The general process for precipitating iodine as silver iodide is described in United States Patent No. 1,837,777. The commonly available natural brines have only an extremely small iodine content, e. g. from 40 to 60 parts per million, the iodine being contained therein as a soluble iodide, and the richest of such brines are usually found in oil fields. The oil field brines contain a considerable amount of organic impurities which contaminate the silver iodide precipitate, are difficult to separate and cause losses in the yield of iodine. It is an object of this invention to provide an improved procedure for removing the aforesaid organic impurities from the silver iodide, which procedure makes possible a higher degree of recovery of the iodine values in the crude precipitate.

In the process as hitherto carried out on a commercial scale, the raw brine is first submitted to a clarifying and settling treatment, after which the clear brine is decanted off and filtered, then treated with a silver salt solution in amount required to precipitate all of its iodine content, the precipitation being facilitated by vigorous agitation of the solution. Since the brine contains a relatively large amount of chlorides and also has a larger bromine content than of iodine, the precipitate initially formed may consist mostly of silver chloride or bromide instead of the iodide, but upon thorough stirring and mixing with the body of brine under treatment, such chloride and bromide are converted to the more insoluble iodide. To aid in settling the silver iodide precipitate a coagulating agent, such as ferric chloride, is added. In spite of the fact that the clarified and filtered brine prior to precipitation of the iodine is apparently clear, nevertheless it still contains more or less organic matter in dissolved or colloidally dispersed condition, which accompanies and contaminates the silver iodide precipitate, giving to it a dark color and a pronounced empyreumatic odor. The percentage of organic matter in the precipitate may amount to as much as 5 to 10 per cent. Thus far no practicable method had been found for separating this organic matter from the brine prior to the precipitation of the silver iodide, in its practical aspects the problem being rendered especially difficult of solution owing to the enormous volume of brine to be handled in proportion to the quantity of silver iodide precipitate obtained. Accordingly, the practice has been to heat the crude precipitate at a sufficiently high temperature to carbonize or destroy as much of the organic matter as possible without causing loss of iodine due to decomposition of silver iodide during the heating. The material after heating, however, still contained considerable organic matter. Such impure silver iodide was then treated with metallic iron, conveniently in the form of iron nails, and water to form a precipitate of metallic silver and a solution of ferrous iodide, $FeI_2$, which were separated. The metallic silver was converted to a silver salt to be used for treating additional brine, while the ferrous iodide solution was chlorinated to liberate free iodine, which was then separated from the resulting ferric chloride solution, and further purified or converted into iodine compounds.

Numerous operating difficulties were encountered in carrying out the process as just described, due largely to the presence of the organic matter. There was always some loss of iodine when the crude precipitate was heated to carbonize the organic matter. The precipitate, when mixed with iron and water to reduce the silver iodide, reacted sluggishly, a single batch requiring many hours to go to completion. Some of the organic impurities remained in the ferrous iodide solution, and when the latter was chlorinated to precipitate free iodine, some of the iodine combined with the organic matter and was lost. The organic matter accompanied the iodine through every step of the process, and its presence greatly increased the difficulty of preparing products of commercial purity from the crude iodine obtained. Another portion of the organic impurities accompanied the finely divided metallic silver, or "silver mud", which was precipitated in the reduction step, and made it difficult to filter and wash clean from the ferrous iodide solution. Altogether the organic matter caused serious losses of iodine and added materially to the cost of operating the process.

We have now found that the organic matter in the crude silver iodide precipitate may be completely removed and separated therefrom without loss of iodine prior to treating the silver iodide with metallic iron, thereby avoiding the losses and operating difficulties in the subsequent process steps. Our improvements are based upon the discovery that silver iodide is completely soluble in a concentrated ferrous iodide solution, from which it can be precipitated again by diluting the solution. Accordingly, by dissolving the impure silver iodide precipitate in a strong ferrous iodide solution, the organic matter, which is insoluble in the solution, can be separated by filtration, whereupon the filtered solution is diluted to reciprocate the silver iodide, and the latter can then be worked up to produce iodine according to the procedure already outlined without interference or losses such as were formerly caused by presence of the organic matter. The invention is particularly set forth and explained in the following description and annexed drawing.

In said drawing, the single figure shows a flow diagram of the improved process for preparing iodine from crude silver iodide comprising the novel steps which constitute our invention.

As we have found, although silver iodide is extremely insoluble in water and dilute aqueous solutions, it readily dissolves in a concentrated ferrous iodide solution. The range of solubility is set out in the following table, in which vertical column No. 1 shows the strength of the ferrous iodide solution, No. 2 the specific gravity of the solution, No. 3 the percentage by weight of silver iodide dissolved by the ferrous iodide solution at normal temperature, and No. 4 the specific gravity of the resulting solution.

| Percent $FeI_2$ solution | Sp. gr. | Percent AgI | Sp. gr. |
|---|---|---|---|
| 59.0 | 1.78 | 32.0 | 2.47 |
| 41.0 | 1.45 | 15.0 | 1.69 |
| 24.0 | 1.24 | 2.0 | 1.28 |
| 13.0 | 1.12 | 0.16 | 1.12 |
| 7.0 | 1.06 | 0.024 | 1.06 |

It is seen that silver iodide is almost insoluble in a weak ferrous iodide solution, but as the concentration of ferrous iodide is increased the solubility of silver iodide rises rapidly to a considerable figure. In practice we have found it advantageous to employ a 55 to 60 per cent ferrous iodide solution, having a specific gravity of 1.7 to 1.8, for dissolving the crude silver iodide precipitate. Upon diluting the resulting solution to a specific gravity of about 1.2 or less, substantially all of the silver iodide is thrown down again.

The complete process description will be most clearly understood when read with reference to the drawing. The raw oil field brine, which normally has a pronounced alkaline reaction, is received in a clarifying and settling basin 1 which may be provided with a sand filter bed. In basin 1 the brine may be treated with a coagulating agent to promote subsidence of suspended matter. The clear brine drawn off from the bottom of basin 1 flows to a precipitating tank 2, provided with means for rapid agitation, and there mixed with the required amount of a silver salt solution, e. g. silver nitrate, to precipitate all of the iodine in the brine as silver iodide. The precipitate is finely divided and settles very slowly, so that to facilitate settling a coagulating agent, such as ferric chloride, is added. The clear supernatant liquor is decanted off and run to waste, while the settled sludge is drawn off to settling tank 3, where it is further settled and decanted from the liquor, and washed. The settled sludge, containing silver iodide, ferric hydroxide and impurities, is then treated with hydrochloric acid to remove iron compounds and other acid-soluble impurities, the residual precipitate being separated from the acid liquor in filter 4. The filtrate containing ferric chloride in solution may be returned to tank 2 for treating a further quantity of brine.

The filter cake from filter 4, after washing, consists substantially of silver iodide and organic matter, a typical analysis of the cake being: AgI—60.0 per cent, $H_2O$—32.5 per cent, organic matter—7.5 per cent, Cl+Br—trace. This cake is charged into a dissolving tank 5, provided with an agitator and heating means, such as steam coils. A ferrous iodide solution of about 1.8 specific gravity is introduced into tank 5, and the silver iodide from the filter cake is dissolved therein by stirring and heating to boiling, while the organic matter remains undissolved. Iron or steel heating coils may be used with solutions of the strength handled in this step, inasmuch as such coils become plated with an adherent coating or metallic silver which protects from further action. The suspended organic matter in the solution is not readily filterable, but by adding a filter-aid, such as fuller's earth, diatomaceous earth, filter-cel, etc., to absorb the more or less tarry organic matter, it can be filtered easily. Accordingly, a filter-aid is admixed with the contents in tank 5, and the latter then filtered through filter 6. The clear filtrate is free from all organic matter or tarry odor. The filter cake is washed first with strong ferrous iodide solution to remove all of the silver compound, and then with water to remove excess of iodide, after which the cake is discarded.

The filtrate and washings from filter 6 are run to a diluting tank 7, and sufficient water is added to reduce the specific gravity of the solution to about 1.2. Thereby most of the silver iodide is reprecipitated in substantially pure form. Both precipitate and solution from tank 7 are transferred to a convertor or reactor 8, a preferred form of which consists of a more or less cylindrical vessel horizontally disposed and provided with mechanism for rotating the same and with a lining of non-corroding material, such as rubber. A quantity of metallic iron is added to the contents of the reactor 8, such iron being in a form offering a relatively large contact surface, such as nails, sheet clippings, turnings, etc. The iron reduces the silver iodide to form metallic silver and ferrous iodide. The silver forms a loose, non-adherent deposit on the iron at the concentration of aqueous solution employed, such deposit being continually removed from the iron surfaces by the grinding action of the mixture in the reactor as the latter revolves, thus maintaining exposed iron surfaces to carry on the reaction. Owing to the absence of organic impurities in the silver iodide prepared as just described, the reduction with iron in this step takes place in but a fraction of the time previously required, and the subsequent separation of metallic silver from the solution is facilitated.

When all of the silver iodide has been reduced, the contents of the reactor are dumped into a coarse-screen bottomed receiver 9, wherein the surplus iron is caught on the screen and washed free of iodide solution and metallic silver. The latter in its loose finely divided condition is easily separated from the iron by washing. The ferrous iodide solution together with the suspended silver is conducted to a filter 10 where separation takes place. The filtrate is run to a concentrator 11, where it is evaporated to a specific gravity of about 1.8, a portion of the concentrated solution being returned as needed to the process for dissolving silver iodide in tank 5 and for washing the cake in filter 6. The balance of the ferrous iodide solution is worked up for preparing the iodine product of the process. It is delivered to a chlorinator 12 where it is treated with chlorine in amount required to oxidize all of the ferrous iodide to iodine, which is precipitated, and separated from the resulting ferric chloride solution in filter 13. The ferric chloride solution may be returned to precipitating tank 2 to coagulate the silver iodide precipitate in another quantity of brine.

The cake of metallic silver in filter 10 is thoroughly washed with water, the washings being run either to concentrator 11 or to diluting tank 7. The washed cake, called "silver mud", which contains some iron hydroxide or metallic iron impurity, is transferred to a roaster furnace 14, wherein it is heated to a temperature of around 1000° C. for an hour or more to convert the iron compounds to a form of ferric oxide insoluble in nitric acid, which treatment also partially melts and agglomerates the metallic silver therein. The roasted material is then treated with nitric acid in a suitable tank 15 to dissolve up the silver, forming a silver nitrate solution which is separated from the insoluble iron oxide and then returned to precipitating tank 2 to treat a further quantity of brine.

The process may be carried out, if desired, with separate treatment of the silver iodide precipitate from diluting tank 7 instead of transferring the precipitate and solution together from tank 7 to convertor 8, as described. Such silver iodide is substantially pure, whereas the solution may contain a small amount of chlorides or bromides, if such were present in the initial crude precipitate, which tend to introduce some impurity into the final iodine product. To produce ferrous iodide of highest purity, therefore, the silver iodide precipitate from tank 7 may be separated from the solution, and then introduced into convertor 8 along with metallic iron and sufficient water for the reaction, the subsequent process steps are the same as already described. The solution from tank 7, which may still contain an appreciable amount of dissolved silver iodide may be similarly treated to recover its silver and iodine content, or it may be returned directly to the process by recycling to diluting tank 7, where it may be employed to dilute a further quantity of strong ferrous iodide-silver iodide solution.

Inasmuch as ferrous iodide is susceptible to oxidation by contact with the air, it is advisable to carry out the steps of dissolving the impure silver iodide in strong ferrous iodide solution, diluting the resulting solution to reprecipitate silver iodide, and reduction of the latter with iron, as well as the handling of the solutions and precipitates involved, in such manner as to prevent the free access of air. Otherwise some oxidation of ferrous iodide may occur, with formation of ferric hydroxide and free iodine, thereby interfering with the orderly progress of the process and giving rise to possible losses of silver or iodine.

The highly pure ferrous iodide solution produced in the manner described may be used directly for the preparation of commercial iodine compounds, as well as iodine itself, employing known methods for the purpose. For instance, alkali metal iodides may be directly prepared by treating the ferrous iodide solution with the alkali metal hydroxide or carbonate, separating the resulting solution from the precipitated iron compound, and crystallizing the alkali metal iodide from the solution.

Although in the preferred embodiment of the invention as hereinbefore described a strong ferrous iodide solution having a specific gravity of about 1.8 is used for treating the crude silver iodide precipitate, the invention is not limited thereto but includes the employment of a strong ferrous iodide solution of whatever degree of concentration is sufficient to dissolve silver iodide without necessitating the use of excessive volumes of the solution. As appears from the table above, a solution having a specific gravity as low as 1.45, or lower, possesses a considerable degree of solubility for silver iodide and may be used in our process, although somewhat less advantageously on account of the relatively greater proportions of ferrous iodide required relative to the silver iodide that may be dissolved in the weaker solution. Likewise, the dilution of the ferrous iodide-silver iodide solution to a specific gravity of about 1.2 to reprecipitate silver iodide is a preferred, and not a limiting, condition, and may be varied within a considerable range so as to precipitate all or only a major portion of the silver iodide. It is not essential to precipitate all of the silver iodide, since the precipitate and solution together may be treated wth metallic iron to reduce the silver iodide and produce a resulting ferrous iodide solution from which iodine of high commercial purity may be readily prepared. The principal advantage of diluting the strong ferrous iodide-silver iodide solution, prior to reducing with metallic iron, is that in the presence of the more dilute solution metallic silver is deposited in a loose, non-adherent form which is easily removed from the iron surface, thus enabling the latter to be maintained in active condition for continuing the reduction. On the other hand, treatment of strong solutions with metallic iron produces an adherent deposit of silver on the iron surface which soon coats the latter completely and thus prevents further action.

Other modes of applying the principle of our invention may be employed instead of the one explained, change being made as regards the process or method herein disclosed, provided the step or steps stated by any of the following claims or the equivalent of such stated step or steps be employed.

We therefore particularly point out and distinctly claim as our invention:—

1. The method of purifying crude silver iodide which comprises treating the crude material with a concentrated ferrous iodide solution to dissolve the silver iodide and separating the resulting solution from undissolved impurities.

2. The method of purifying crude silver iodide which comprises treating the crude material with a concentrated ferrous iodide solution to dissolve the silver iodide, separating the resulting solution from undissolved impurities and diluting the solution to reprecipitate silver iodide therein.

3. The method of purifying crude silver iodide which comprises treating the crude material with a concentrated ferrous iodide solution to dissolve the silver iodide, separating the resulting solution from undissolved impurities and diluting the solution to reprecipitate silver iodide therein, reducing the silver iodide to form metallic silver and a soluble iodide solution, and recovering iodine from the last-mentioned solution.

4. The method of purifying crude silver iodide which comprises treating the crude material with a concentrated ferrous iodide solution to dissolve the silver iodide, separating the resulting solution from undissolved impurities and diluting the solution to reprecipitate silver iodide therein, reducing the silver iodide with metallic iron to form metallic silver and a ferrous iodide solution and processing such ferrous iodide solution for the preparation of iodine or iodine compounds.

5. The method of purifying crude silver iodide from accompanying impurities which comprises treating the crude material with a strong ferrous iodide solution having a specific gravity of about 1.8 to dissolve the silver iodide, separating the resulting solution from undissolved impurities, and diluting the solution to a specific gravity of about 1.2 to reprecipitate silver iodide therein.

6. The method of purifying crude silver iodide from accompanying impurities which comprises treating the crude material with a strong ferrous iodide solution having a specific gravity of about 1.8 to dissolve the silver iodide, separating the resulting solution from undissolved impurities, and diluting the solution to a specific gravity of about 1.2 to reprecipitate silver iodide therein, reducing such silver iodide with metallic iron to form metallic silver and a ferrous iodide solution, separating such silver from the solution, concentrating the latter to a specific gravity of about 1.8, returning a portion of the concentrated solution to the first step, and processing the remainder thereof for the preparation of iodine or iodine compounds.

7. The process of producing iodine from natural brines and the like which comprises treating such brine with a silver salt to precipitate the iodine therein as silver iodide, separating the crude silver iodide precipitate, dissolving the precipitate in a strong ferrous iodide solution, separating the resulting solution from undissolved impurities, diluting the solution to reprecipitate silver iodide therein, reducing such iodide to form metallic silver and a soluble iodide solution, separating such silver and processing the iodide solution for the preparation of iodine or iodine compounds.

8. The process of producing iodine from natural brines and the like which comprises treating such brine with a silver salt to precipitate such iodine as silver iodide, separating the crude precipitate, dissolving silver iodide from such precipitate by treating with a strong ferrous iodide solution, separating the resulting solution from undissolved impurities, diluting the solution to reprecipitate silver iodide therein, reducing such iodide with metallic iron to form metallic silver and a ferrous iodide solution, separating such silver and converting the same to a silver salt for treating a further quantity of brine.

9. The process of producing iodine from natural brines and the like which comprises treating such brine with a silver salt to precipitate the iodine as silver iodide, separating the crude precipitate, dissolving silver iodide from such precipitate by treating with a ferrous iodide solution having a specific gravity of about 1.8, separating the resulting solution from undissolved impurities, diluting the solution to a specific gravity of about 1.2 to reprecipitate silver iodide therein, reducing the silver iodide with metallic iron in the presence of water to form metallic silver and a ferrous iodide solution, separating the silver from the solution, and processing said solution for the preparation of iodine or iodine compounds.

10. The process of producing iodine from natural brines and the like which comprises treating such brine with a silver salt to precipitate the iodine as silver iodide, separating the crude precipitate, dissolving silver iodide from such precipitate by treating with a ferrous iodide solution having a specific gravity of about 1.8, separating the resulting solution from undissolved impurities, diluting the solution to a specific gravity of about 1.2 to reprecipitate silver iodide therein, treating the solution and silver iodide together with metallic iron to reduce the iodide to metallic silver and form a ferrous iodide solution, separating the silver from the solution and converting the same to a silver salt for treating a further quantity of brine.

11. The process of producing iodine from natural brines and the like which comprises treating such brine with a silver salt to precipitate the iodine as silver iodide, separating the crude precipitate, dissolving silver iodide from such precipitate by treating with a ferrous iodide solution having a specific gravity of about 1.8, separating the resulting solution from undissolved impurities, diluting the solution to a specific gravity of about 1.2 to reprecipitate silver iodide therein, treating the solution and silver iodide together with metallic iron to reduce the iodide to metallic silver and form a ferrous iodide solution, separating the silver from the solution, concentrating the ferrous iodide solution to a specific gravity of about 1.8, returning to the process a portion of such concentrated solution for treating the crude silver iodide precipitate, and processing the remainder of such solution for the preparation of iodine or iodine compounds.

12. The process according to claim 11, in which the reprecipitated silver iodide is separated from the solution and then reduced with metallic iron in the presence of water to form metallic silver and a ferrous iodide solution.

13. In the preparation of iodine from natural brines by precipitation as silver iodide, wherein such precipitate is contaminated by organic impurities and the like, the steps which consist in treating the crude precipitate with a ferrous iodide solution having a specific gravity of about 1.8 to dissolve the silver iodide, separating the solution from the undissolved impurities and reprecipitating silver iodide by diluting the solution to a specific gravity of about 1.2.

SHELDON B. HEATH.
MAUREL F. OHMAN.